(12) United States Patent
Offrein et al.

(10) Patent No.: US 9,213,154 B2
(45) Date of Patent: Dec. 15, 2015

(54) OPTOELECTRONIC PACKAGING ASSEMBLY

(71) Applicant: International Business Machines Corporation, Armonk, NY (US)

(72) Inventors: Bert Jan Offrein, Schoenenberg (CH); Ibrahim Murat Soganci, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/222,769

(22) Filed: Mar. 24, 2014

(65) Prior Publication Data

US 2014/0294342 A1 Oct. 2, 2014

(30) Foreign Application Priority Data

Mar. 28, 2013 (GB) .................................. 1305732.8

(51) Int. Cl.
G02B 6/12 (2006.01)
G02B 6/42 (2006.01)
G02B 6/43 (2006.01)
G02B 6/136 (2006.01)

(52) U.S. Cl.
CPC ............... *G02B 6/4214* (2013.01); *G02B 6/43* (2013.01); *G02B 6/136* (2013.01); *G02B 6/4204* (2013.01)

(58) Field of Classification Search
CPC ........................................................ G02B 6/43
See application file for complete search history.

(56) References Cited

U.S. PATENT DOCUMENTS

| 6,950,570 | B1 * | 9/2005 | Novotny ........................ 385/18 |
| 2007/0147842 | A1 | 6/2007 | Haney et al. |
| 2012/0251033 | A1 | 10/2012 | Matsuoka et al. |

FOREIGN PATENT DOCUMENTS

EP 2535749 12/2012

OTHER PUBLICATIONS

Schroder et al., "glassPack—A 3D glass based interposer concept for SiP with integrated optical interconnects," Proc. 60th Electron. Comp. Technol. Conf., 2010, pp. 1647-1652.

* cited by examiner

*Primary Examiner* — Omar R Rojas
(74) *Attorney, Agent, or Firm* — Jeff Tang

(57) ABSTRACT

An optoelectronic packaging assembly having an optical interposer and a method of same. The assembly includes a photonic and/or optoelectronic device; a planar optical interposer coupled to the photonic and/or optoelectronic device on a first side of the optical interposer and including an optical transmission element on a second side opposite to the first side; a deflecting element; and at least one optical waveguide on the first side, in-plane with the optical interposer. The waveguide is coupled at one end to the photonic and/or optoelectronic device and at another end to the deflecting element. The deflecting element is configured to enable optical transmission between the waveguide and the optical transmission element through the optical interposer. The optical interposer includes a material allowing for optical transmission between the deflecting element and the optical transmission element.

19 Claims, 4 Drawing Sheets

OPTOELECTRONIC PACKAGING ASSEMBLY

CROSS-REFERENCE TO RELATED APPLICATION

This application claims priority under 35 U.S.C. §119 from European Patent Application No. 1305732.8 filed Mar. 28, 2013, the entire contents of which are incorporated herein by reference.

BACKGROUND OF THE INVENTION

1. Field of the Invention

The invention relates to the field of photonic and/or optoelectronic packaging assemblies. In particular, it is directed to a packaging assembly that includes an optical interposer, preferably, an electro-optical interposer.

2. Description of Related Art

The processing capacity of computing systems continues to increase considerably. The interconnection density of processing units has to increase at similar rates in order to maintain efficiency of such systems. Electrical interconnects, which are used for data transfer so far, are becoming a bottleneck. As an alternative, optical interconnects provide much denser data bandwidth, lower power consumption and no electromagnetic interference. Therefore, optical interconnects are being deployed at increasing portions of computing systems. Optical interconnects are expected to be employed in a large part of the data links reaching the processor package in a few years.

Despite its clear advantages, optical interconnection brings new challenges to the assembly of computing systems. The common method of interfacing photonic transceivers to external components is based on connecting each on-chip waveguide, laser, or photodetector to an optical fiber. Considering that a very large number of optical channels are expected to be required in the future, this process is condemned to remain very expensive, which can impede widespread employment of optical interconnects.

The following references provide further background.

U.S. Pat. No. 7,366,375 discloses an optical waveguide device on which optical lenses are bonded. U.S. Pat. No. 7,379,639 discloses an assembly that includes optical waveguides with mirrors aligned to optical lenses.

P. Marcoux et al., "Through silicon via (TSV) technology creates electro-optical interfaces," Proc. Optical Interconnects Conference, pp. 82-83, 2012, describes a silicon interposer that includes through silicon vias and optical fiber channels.

Other non-patent literature in this technical field that provide further background are: L. Brusberg et al., "Photonic system-in-package technologies using thin glass substrates," Proc. 11$^{th}$, Electronics Packaging Technology Conference, pp. 930-935, 2009; L. Brusberg et al., "Chip-to-chip communication by optical routing inside a thin glass substrate," Proc. Electronic Components and Technology Conference, pp. 805-812, 2011; and H. Schröder et al., "glassPack—A 3D glass based interposer concept for SiP with integrated optical interconnects," Electronic Components and Technology Conference (ECTC), 2010 Proceedings 60th, vol., no., pp. 1647, 1652, 1-4 Jun. 2010.

The three non-patent literature references in the preceding paragraph relate to the so-called glassPack, a concept revolving around a glass interposer. They describe a packaging of components that transmit and receive optical signals out of plane (e.g., vertical-cavity surface-emitting lasers (VCSEL) and photodetectors). The interposer described in these references includes optical waveguides at the bottom side or embedded inside the interposer, which couple to components (VCSELS, photodetectors) that are located on the opposite surface of the interposer, via vertical beams.

FIG. 1, herein, was extracted from FIG. 3 of H. Schröder et al., "glassPack—A 3D glass based interposer concept for SiP with integrated optical interconnects," Electronic Components and Technology Conference (ECTC), 2010 Proceedings 60th, vol., no., pp. 1647, 1652, 1-4 Jun. 2010 mentioned above. In FIG. 1, three alternatives for transmitter module integration into electrical-optical circuit board (EOCB) are schematically shown.

In FIG. 1a, a glassPack module is sketched without any internal optical beam deflecting element within the interposer. However, ion exchanged graded index lenses could be integrated for vertical beam collimation. The pads for the interposer TGV are redistributed in order to fit to the EOCB pitch.

In the stacked concept version shown in FIG. 1b, the optical and electrical interconnects are separated in two different layers. The top layer is similar to FIG. 1a, but at the bottom side a glassy optical waveguide element is mounted. Both layers can be assembled using high precision wafer level technology.

FIG. 1c shows the highest degree of integration. The optical waveguides and the beam deflection element are integrated into the interposer to provide horizontal optical interconnects and short vertical electrical TGV, to improve bandwidth and power performances.

SUMMARY OF THE INVENTION

The present invention provides an optoelectronic assembly. The assembly includes: a optoelectronic device; an essentially planar optical interposer coupled to the optoelectronic device on a first side of the optical interposer and including an optical transmission element on a second side of the optical interposer opposite to the first side; a deflecting element; and at least one optical waveguide on the first side of the optical interposer, in-plane with the optical interposer. The optical waveguide is coupled at one end to the optoelectronic device and at another end to the deflecting element. The deflecting element is configured to enable optical transmission between the waveguide and the optical transmission element, through the optical interposer. The optical interposer includes, between the deflecting element and the optical transmission element, a material allowing for optical transmission.

The present invention also provides a method of fabricating the optoelectronic assembly. The method includes the steps of providing an optoelectronic device; fabricating at least one deflecting element as a deflecting mirror by a method selected from laser ablation, blade cutting, two-photon absorption, gray-scale lithography, and imprint; fabricating at least one optical transmission element as an optical microelement by a method selected from photoresist reflow, gray-scale lithography, and two-photon absorption; coupling a planar optical interposer to the optoelectronic device on a first side of the optical interposer and having an optical transmission element on a second side of the optical interposer opposite to the first side; and forming at least one optical waveguide on the first side of the optical interposer and in-plane therewith.

According to the method of the present invention, the least one optical waveguide is coupled at one end to the optoelectronic device and at another end to the deflecting element; the deflecting element is configured to enable optical transmission between the least one optical waveguide and the optical transmission element through the optical interposer; and the optical interposer contains a material between the deflecting element and the optical transmission element, the material allowing for optical transmission.

BRIEF DESCRIPTION OF THE DRAWINGS

FIG. 1a is a schematic drawing of a glass interposer; FIG. 1b is a schematic drawing of a stacked e/o interposer; and FIG. 1c is a schematic drawing of an integrated e/o interposer.

DETAILED DESCRIPTION OF THE PREFERRED EMBODIMENTS

Devices, components, packaging assemblies and methods embodying the present invention are described below, by way of non-limiting examples, and in reference to the accompanying drawings.

First, general embodiments and high-level variants of the present invention are described.

In reference to FIGS. 2 to 6, one aspect of the present invention is shown and described which concerns photonic and/or optoelectronic integrated circuit devices. Since "integrated circuit" typically refers to monolithic integrations, the preferred terminology is "packaging assembly", and the description below refers to this as "packaging". Packaging P includes a photonic and/or an optoelectronic device OC (also denoted by reference $OC_n$, n=1, 2, . . . in FIG. 6 and related embodiments), such as a photonic and/or optoelectronic chip. Such a device is hereinafter referred to as "OC device" or "OC chip". Such devices are known per se.

Figure 2:
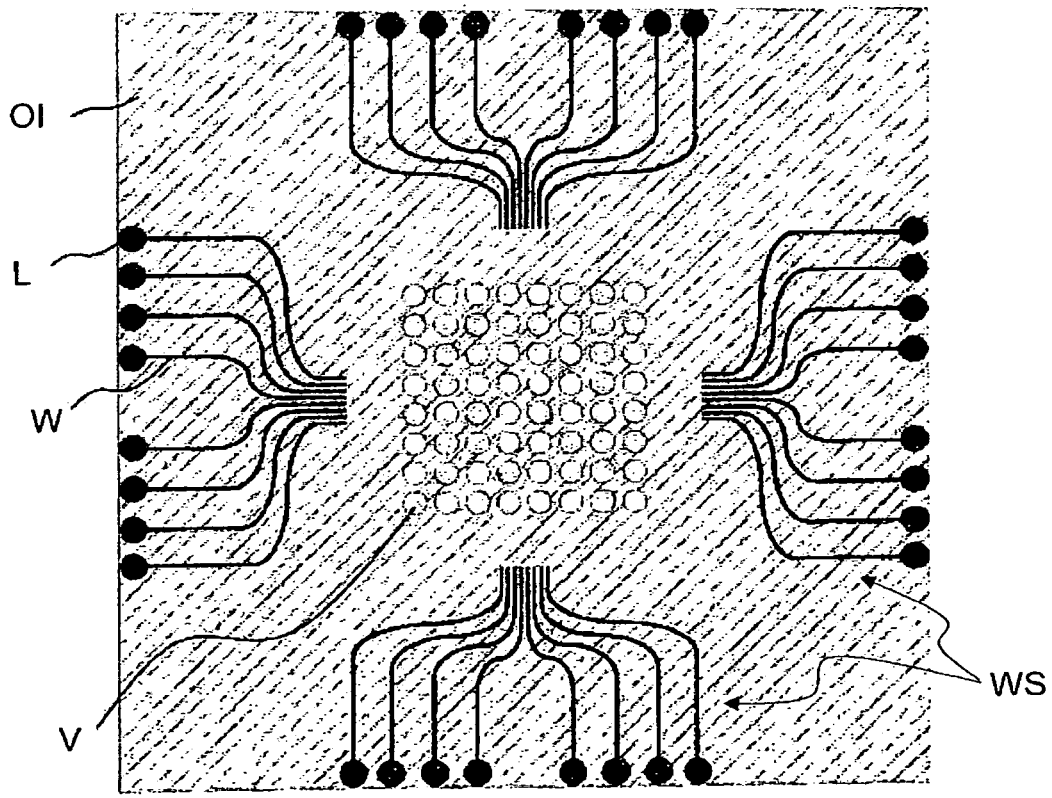
FIG. 2 shows a top view of an electro-optical interposer.
Figure 3:
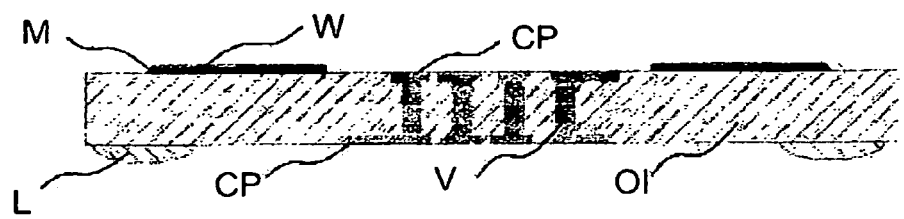
FIG. 3 is a two-dimensional, cross-sectional view of an interposer such as depicted in FIG. 2.

Packaging P also makes use of optical interposer OI, $OI_n$, which, from a structural point of view, is essentially planar. An example of such an optical interposer is shown in FIGS. 2 and 3. The optical interposer can be coupled to the OC device on a first side thereof, i.e., the upper side in FIGS. 3-6 or the top side in FIG. 2. This optical interposer includes an optical transmission element, such as a microlens L, $L_n$ on a second side opposite to the first side, i.e., the lower side of the interposer in FIGS. 3-6.

Furthermore, packaging P includes at least one optical waveguide W, $W_n$ extending on the first side, i.e., in-plane with optical interposer OI. Optical waveguide W, $W_n$ is coupled at one end to the OC device and at another end to deflecting element M, $M_n$. Deflecting element M, $M_n$ can be a reflection element, such as a mirror, a diffractive element, such as a grating coupler. More generally, deflecting element M, $M_n$ can be any element, including a prism, a lens or even a curved waveguide, which allows light to propagate from waveguide W, $W_n$ towards the transmission element L, or conversely, from L to W, i.e., any element allowing for "deflecting" optical signal. Yet, a simple mirror is preferred for ease of manufacture and cost reasons. In all cases, deflecting element M, $M_n$ is configured and/or arranged such as to enable optical transmission between optical waveguide W, $W_n$ and optical transmission element L, $L_n$, and through optical interposer OI, $OI_n$. More precisely, deflecting element M, $M_n$ can allow for optical signal transmission from optical waveguide W, $W_n$ to the optical transmission element and/or conversely, from optical transmission element to optical waveguide W, $W_n$.

How to confer unidirectional or bi-directional light propagation properties to such an optical transmission element is known in the art. All waveguides evoked herein may be standard optical waveguides, typically including core Wco and cladding Wcl as explicitly referred to in FIG. 4, and is as otherwise usual per se in the art, unless otherwise stated.

Optical waveguides W, $W_n$ are used for routing and, together, with the integrated deflecting element and the optical transmission element, allow for controlling the beam characteristics. In all cases, optical transmission intervenes directly through the bulk of the optical interposer, without requiring any other optical propagation device, hence the name, optical interposer. This means that the optical interposer must include a material that allows for optical transmission, at least in the region between deflecting element M, $M_n$ and optical transmission element L, for wavelengths of interest in the field. Examples are given below.

Figure 1:
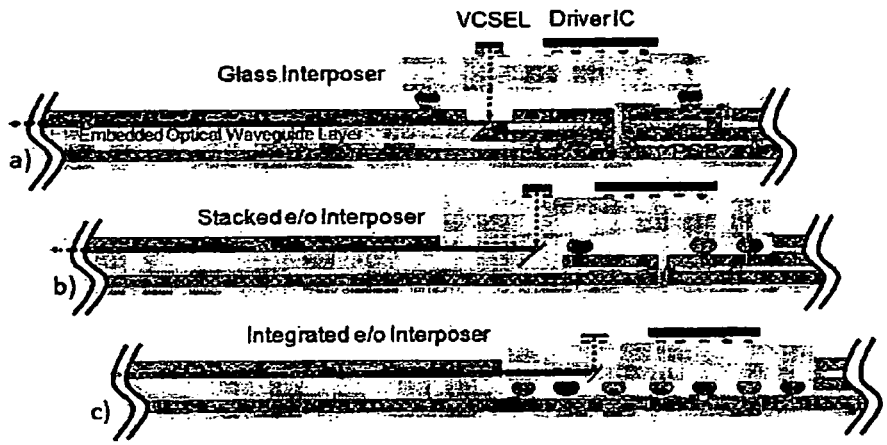
FIG. 1 shows a prior art, schematic drawing of three different concepts for the so-called "glassPack" electro-optical modules and appropriate PCB integration schemes.

Thus, the present invention relies first and foremost on an electro-optical interposer, which facilitates both optical and electrical connectivity to photonic and/or optoelectronic device(s). A main difference between the present invention and known solutions such as that in FIG. 1, is that the present invention enables both in-plane and out-of-plane optical coupling between one or more waveguides and an OC device (both on the optical interposer), and the possibility of both in-plane and out-of-plane coupling between the optical interposer and external components, with controllable beam characteristics, e.g., direction, numerical aperture, diameter.

Especially important is the possibility of both in-plane and out-of-plane coupling between waveguides and OC devices as this opens new possibilities for coupling. The most well-known out-of-plane coupling methods for photonic chips (except vertically-emitting lasers and vertically receiving photodetectors) make use of diffraction gratings in the photonic chip. Despite the research efforts on grating couplers, the loss of these couplers is still in the order of a few dB. Moreover, they are wavelength-sensitive devices by nature because of diffractive operation. Solutions that rely on out-of-plane coupling, such as the one in FIG. 1, are limited by the disadvantages of grating couplers.

On the contrary, the present invention is compatible with other coupling methods, such as lensed in-plane coupling, adiabatic coupling, and directional coupling in addition to the grating-based coupling. The in-plane coupling methods mentioned above have lower coupling loss and wavelength dependence than grating-based coupling. In particular, less than 1 dB coupling loss can be achieved using adiabatic coupling, in which silicon waveguide and polymer waveguide are in contact. This is achieved with polymer waveguides on the top side of the interposer. Such low losses can for instance not be achieved with grating couplers.

In the glassPack-related prior art, an optoelectronic device is mounted on a transparent interposer and a mirror and waveguide are available on the other side of the interposer.

Therefore, light has to go through the transparent interposer and the mirror to couple between the optoelectronic device and the waveguide. Contrast this with the present invention where the waveguide is on the same side of the interposer as the photonic/optoelectronic device/chip/component, such that direct coupling between the photonic/optoelectronic chip/component and the waveguide is possible. Direct coupling leads to lower optical loss than the prior art solution because each additional element, e.g. gratings on the OC chip and mirrors at the end of the polymer waveguides, introduces loss to the optical link.

The present invention provides a combination of optical waveguides, integrated deflecting elements and optical transmission elements. This provides versatility of optical connectivity configurations, and makes it possible to use the form of photonic/optoelectronic packaging for applications including, but not limited to, interconnection between a photonic chip and an optical printed circuit board, and optical interconnection to chips in 2.5 or 3-D stacks. Moreover, all of the aforementioned components—optical waveguides, transmission elements (lenses), deflection elements (mirrors), and if necessary electrical vias (for added electrical connections to the OC device)—can be fabricated integrally with the optical interposer OI. This offers the potential for low cost fabrication.

Embodiments of the invention include involve several optical waveguides W, terminated at one end by a deflecting element M, as depicted in FIGS. 2-3, and even several sets WS of optical waveguides W, where each waveguide W of a set WS is in-plane with the optical interposer OI and coupled to both an OC device, preferably the same OC device to which the optical interposer is otherwise coupled, and a respective deflecting element M. The deflecting element M is configured to enable optical transmission through the optical interposer OI, as illustrated in the appended drawings by dotted double arrows.

Preferably, the optical interposer is bonded to the OC device, on the first side of the device. Yet, in variants, additional planar components may need to be inserted in between, for various reasons such as contact, insulation, fabrication constraints, and the like. The optical transmission element can be a lens or a microlens, or more generally, any device capable of directing a light beam to/from the deflecting element M, $M_n$. More generally, any optical transmission element L, $L_n$, Lo referenced in this description can be a microlens, that is, an optical element adapted for focusing optical signals to and/or from deflecting element M, $M_n$ or even another optical transmission element L, $L_n$, Lo located relative thereto.

The packaging assembly can also include a number of additional features, as described in embodiments below and as otherwise depicted in the accompanying drawings, such as a standard chip C, $C_n$, i.e., not a photonic and/or optoelectronic chip; an additional electrical interposer EI (not being an optical/electro-optical interposer as defined above); additional opposite lenses Lo; lens substrates $S_L$, chip substrates $S_C$; additional waveguides Wa; through vias e.g., through-interposer vias V for electrical interconnection to an OC device/chip or another device/chip/component; contact pads CP and additional contacts; optical printed circuit board PCB; and solder bumps B.

Figure 4:
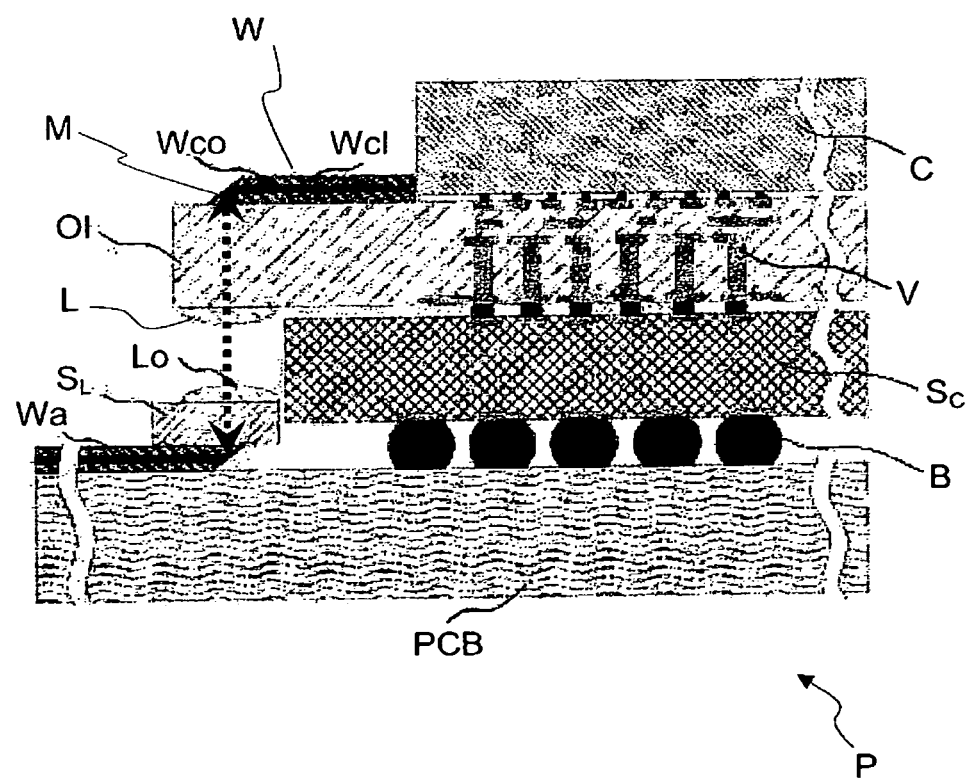
FIG. 4 schematically illustrates a cross section of a packaging assembly that includes a photonic chip, an electro-optical interposer, an organic substrate and a printed circuit board (PCB) with optical waveguides.
Figure 5:
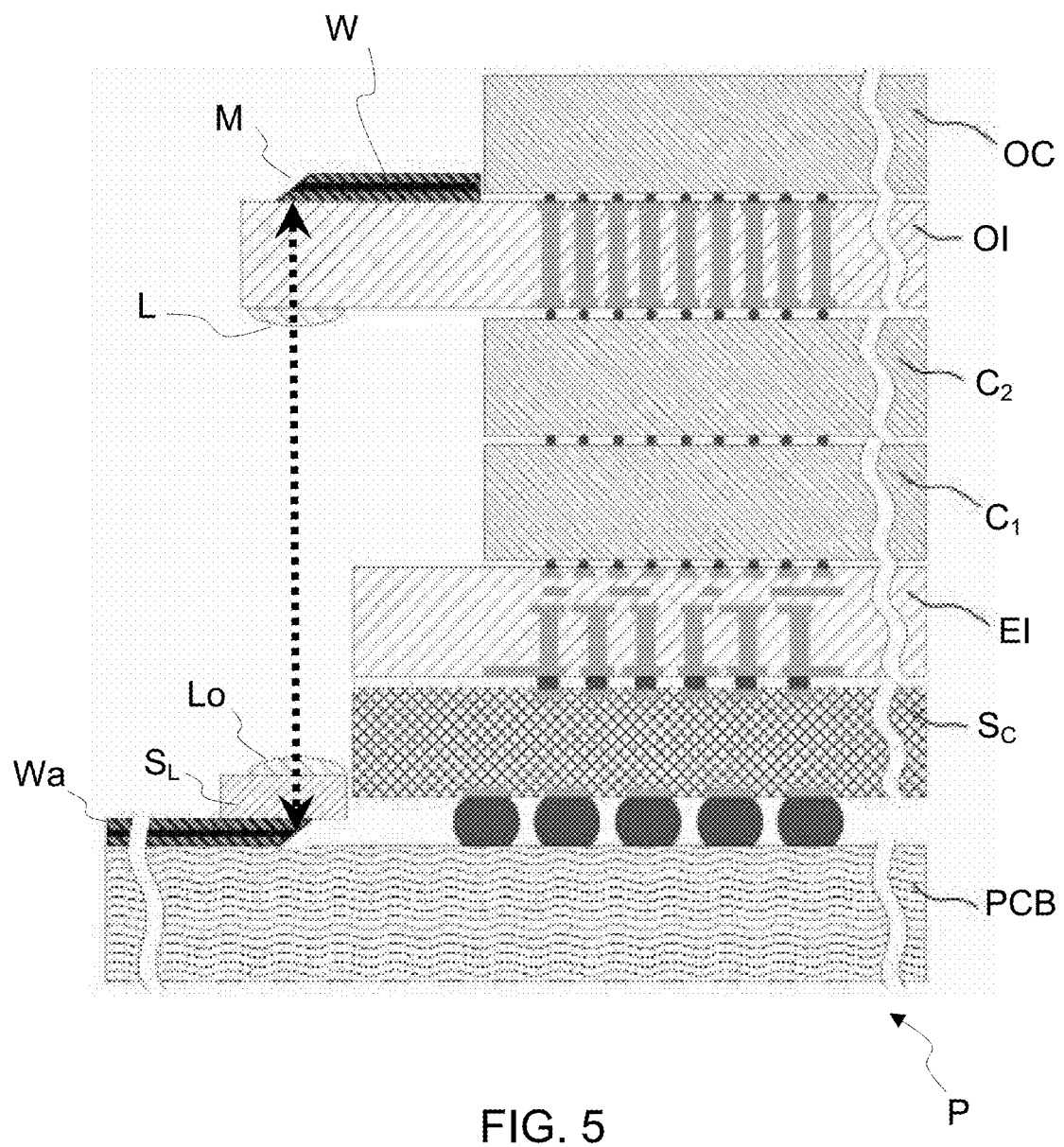
FIG. 5 schematically illustrates a cross section of a packaging assembly that includes a vertical stack of chips, including one with photonic functionality, vertically connected to an optical PCB.
Figure 6:
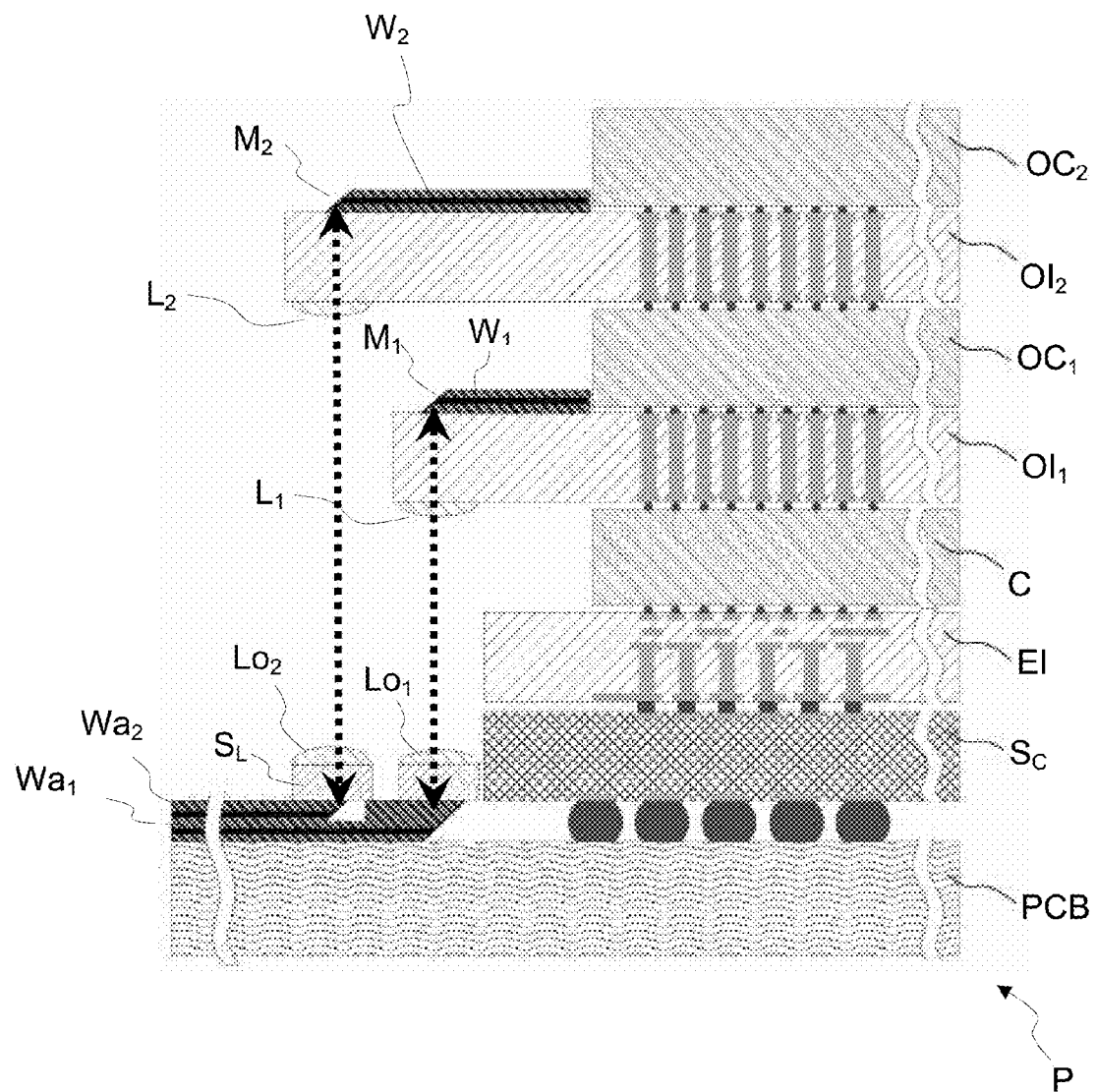
FIG. 6 schematically illustrates a cross section of a packaging assembly including another vertical stack of chips, including two chips with photonic functionality, coupling to multilayer waveguides on an optical PCB, according to further embodiments

In particular, and referring now to FIGS. 4-6, packaging P can also include one or more additional planar components $S_L$, $S_C$, C, PCB, EI, etc., on the lower side of optical interposer OI. One of these additional components, e.g., a substrate $S_L$ in the drawings, can include an additional optical transmission element Lo, such as a lens, or microlens Lo. This additional optical transmission element Lo is located vis-à-vis, or opposite to, optical transmission element L, $L_n$, of optical interposer OI, $OI_n$. Accordingly, optical signals can be transmitted from the optical transmission element L, $L_n$ of optical interposer OI to this additional optical transmission element Lo, and preferably, from the further optical transmission element Lo to the optical transmission element L of the interposer OI as well. Several additional optical transmission elements Lo can be used, as to be discussed next in reference to FIG. 6.

Referring now to FIG. 6, in some embodiments, packaging P can include a set of optical interposers $OI_1$, $OI_2$, ... $OI_n$. Each optical interposer $OI_n$ is in that case similar to the interposer described earlier, in that they are: essentially planar components; coupled, on a first side, to both at least one respective photonic and/or optoelectronic device $OC_1$, $OC_2$, ...; and at least one, but likely several, respective optical waveguide $W_1$, $W_2$, ..., which include a respective deflecting element $M_1$, $M_2$, ... and are furthermore: in-plane with the optical interposer $OC_1$, $OC_2$, ... are coupled to, whether directly or indirectly, but preferably bonded to the interposer; and coupled to a respective photonic and/or optoelectronic device $OC_1$, $OC_2$, ... at an end; and to a respective deflecting element $M_1$, $M_2$, ... at another end.

Each optical interposer $OI_n$ also includes a respective optical transmission element $L_1$, $L_2$, ... on a second (lower) side, opposite to the first side. Again, deflecting elements $M_1$, $M_2$, ... are arranged and/or configured to enable optical coupling between a respective waveguide to a respective optical transmission element $L_1$, $L_2$, ... Preferably, optical interposers $OI_n$ are essentially parallel to each other, be it for reasons of manufacture.

In addition, and as illustrated in FIG. 5 or 6, additional electrical interposer EI can be provided, for coupling to a chip C. Additional electrical interposer EI is not an optical interposer as defined earlier, e.g., it has no waveguide on it. As further illustrated in FIG. 6, the in-plane positions of the two optical transmission elements $L_1$, $L_2$—here, the two respective optical interposers $OI_1$, $OI_2$, preferably differ. In other words, the projections of the positions in a reference plane parallel to the average plane of optical interposers $OI_1$, $OI_2$ differs. Thus, the two optical transmission elements $L_1$, $L_2$ are adapted to transmit two optical signals out-of-plane, and the signals are transmitted parallel to each other, for example, to another level of waveguides $Wa_1$, $Wa_2$, which route optical signals to other components in the system.

As best seen in FIG. 2 or 3, preferably, optical interposer OI, $OI_n$ is an electro-optical interposer—that is, it includes through-interposer vias V for transmitting electrical signals to and/or from a photonic and/or optoelectronic device to which it is coupled. It can also include upper and lower contact pads CP to that aim, as known per se in the art. For example, suitable electro-optical interposers OI, $OI_n$ can contain silicon and/or glass, and are therefore provided with through-silicon vias V and/or through-glass electrical vias V. For example, suitable glass materials could be selected based on CTE matching to silicon dies they provide, their alkaline content, etc. Borosilicate glass is advantageous as its CTE matches that of silicon. However, other types of glasses can also be used to fabricate optical interposers. The optical interposers contain electrically conducting and insulating materials; suitable conducting materials are Al, Cu, Sn, Ni, Au, and Ag; suitable insulating materials are silicon dioxide ($SiO_2$), silicon nitride ($Si_3N_4$), silicon oxynitride (SiON), polymers, tantalum pentoxide ($Ta_2O_5$), zircon ($ZrO_2$), and aluminum oxide ($Al_2O_3$). Various thicknesses, typically ranging from 20 μm-250 μm, are contemplated for the interposer. Preferably, the thickness is around 100-200 μm. The width and length can vary because these optical interposers are fabricated on large wafers or panels and then singulated. Use of optical interposers of different sizes (e.g. 5 mm×5 mm, 20 mm×20 mm) is also contemplated.

As mentioned above, preferably, optical interposers OI are bonded to a respective OC device, on one side thereof. Similarly, optical waveguides W are preferably bonded directly to an optical interposer OI. Optical waveguides, as well as deflecting and transmission elements, are preferably fabricated integrally. Structurally, optical waveguides slightly protrude from a side of a corresponding optical interposer. Suitable optical waveguides, can for example, include polymers, silicon nitride, silicon dioxide and/or silicon oxynitride. Deflecting elements can be deflecting mirrors, e.g., as obtained by laser ablation, blade cutting, two-photon absorption, gray-scale lithography or imprint. Finally, transmission elements, such as microlenses, can advantageously be fabricated integral with an interposer as well, using photoresist reflow, gray-scale lithography, and/or two-photon absorption methods.

Photoresist reflow is nonetheless preferred because it is compatible with standard processing methods and easier to implement compared to gray-scale lithography and two-photon absorption. Polymer waveguides can be fabricated on the interposer using one of the thin-film deposition methods (e.g. spin coating, spray coating, doctor blading, and ink jet printing), followed by thermal and/or UV-exposure-based polymerization. Waveguides made of other materials (e.g. silicon nitride and silicon dioxide) are fabricated by using one of the deposition methods (e.g. chemical vapor deposition (CVD), sputtering or evaporation), and etching. Typical lens materials are silicon, silicon dioxide, silicon nitride, silicon oxynitride, glass, and polymer. The dimensions of the lenses vary depending on the applications. The lenses used for waveguide coupling usually have diameters of tens of micrometers up to a few hundred micrometers.

In another aspect, the present invention provides a method of fabrication of a packaging P such as discussed above. A convenient process flow is the following: electrical parts of the interposer (e.g. vias, bond pads, insulators) are fabricated. After that, optical waveguides and transmission elements are processed on the interposer. The chip is bonded on the interposer to form electrical and optical coupling between the interposer and the chip. Thereafter, the interposer is bonded with the chip in a configuration that depends on the chosen architecture.

As mentioned above, a significant advantage of present devices is that they can be obtained using conventional methods, such as mentioned above. In particular, waveguides, mirrors and lenses can be fabricated with inexpensive equipment. Present embodiments therefore make it possible to achieve low-cost photonic/optoelectronic chip packaging. The electro-optical interposers can be fabricated at low cost using known methods too, for instance wet or dry etching to make the through-silicon or through-glass vias. The insulators can be formed using thermal oxidation or chemical vapor deposition (CVD). The conducting materials can be deposited using, for example, electroplating. Generally, only electrical interposers are known per se and can be fabricated using known methods.

In embodiments, the packaging assembly further includes one or more further planar components on the second side of the optical interposer, and at least one of said additional planar components includes a further optical transmission element vis-á-vis the optical transmission element of the optical interposer, whereby optical signal can be transmitted from the optical transmission element of the optical interposer to the further optical transmission element.

In preferred embodiments, the packaging assembly includes a set of optical interposers, where each optical interposer of the set is an essentially planar component, is essentially parallel to the other optical interposers of the set, and is coupled, on a first side, to both a respective photonic and/or optoelectronic device and at least one respective optical waveguide. The at least one respective optical waveguide includes a respective deflecting element, is in-plane with said each optical interposer and preferably bonded thereto and is coupled to the respective photonic and/or optoelectronic device at an end and to the respective deflecting element at another end, The packaging assembly also includes a respective optical transmission element on a second side opposite to the first side, the respective deflecting element adapted to transmit optical signal from the respective waveguide to the respective optical transmission element and conversely, from the respective optical transmission element to the respective waveguide.

Preferably, in-plane positions of two optical transmission elements of two respective optical interposers of the set differ, whereby the two optical transmission elements are adapted to transmit two optical signals out-of-plane, and preferably to transmit two optical signals parallel to each other.

Furthermore, at least one optical transmission element of the packaging assembly is a microlens adapted for focusing optical signal to and/or from a deflecting element or another optical transmission element in vis-á-vis.

In other embodiments, at least one optical interposer of the packaging assembly is an electro-optical interposer having through-interposer vias for transmitting electrical signals to and/or from a photonic and/or optoelectronic device to which one or more electro-optical interposers are coupled.

Preferably, at least one optical interposer of the packaging assembly is an electro-optical interposer having silicon and/or glass and through-silicon vias and/or through-glass electrical vias. The vias are adapted for transmitting electrical signals to and/or from a photonic and/or optoelectronic device to which one or more of the electro-optical interposers are coupled.

In preferred embodiments, at least one optical waveguide of the packaging assembly is bonded to an optical interposer and includes one of the following materials: polymer, silicon nitride, silicon dioxide and silicon oxynitride.

Preferably, at least one deflecting element of the packaging assembly is a deflecting mirror as obtained by one of or a combination of the following methods: laser ablation, blade cutting, two-photon absorption, gray-scale lithography and imprint.

Additionally, in preferred embodiments, the packaging assembly has a two-and-a-half dimensional or a three-dimensional packaging assembly configuration.

Preferably, at least one optical interposer of the packaging assembly is bonded to the photonic and/or optoelectronic device it is coupled to, on one side thereof.

In other preferred embodiments, an optical interposer of the packaging assembly includes one or more sets of optical waveguides on a first side thereof, where each waveguide of the set is: in-plane with the optical interposer and coupled at one end to a photonic and/or optoelectronic device to which the optical interposer is coupled, and at another end to a respective deflecting element. The respective deflecting element is configured to enable optical transmission between its respective waveguide and an optical transmission element, through the optical interposer.

Preferably, at least one optical waveguide is integral with the optical interposer it is coupled to, and the optical waveguide can protrude from the first side of this optical interposer. More particularly, one or more of the following is integral with an optical interposer it is coupled to an optical transmission element on a second side opposite to the first side of the optical interposer; a deflecting element coupled to this waveguide; and through-interposer vias.

In embodiments, at least one, and preferably each of the optical transmission elements of the packaging assembly are an optical microelement, preferably a microlens. This can be obtained using one or a combination of the following methods: photoresist reflow, gray-scale lithography and two-photon absorption.

According to another aspect, the present invention is embodied as a method of fabrication of a photonic and/or optoelectronic packaging assembly. The method includes the steps of fabricating a photonic and/or optoelectronic packaging assembly according to any one of the above embodiments. The step of fabricating includes one or more of the following steps: fabricating at least one deflecting element as a deflecting mirror by one of or a combination of the following methods: laser ablation, blade cutting, two-photon absorption, gray-scale lithography and imprint; and fabricating at least one optical transmission element as an optical microelement using one or a combination of the following methods: photoresist reflow, gray-scale lithography and two-photon absorption.

The above embodiments have been succinctly described in reference to the accompanying drawings and may accommodate a number of variants. Several combinations of the above features may be contemplated. Examples are given in the next section.

The following description details specific embodiments and technical implementation of the present invention. The method/components as described above can be used in the fabrication of integrated circuit devices/packagings. The resulting integrated circuit chips can be distributed by the fabricator in raw wafer form—that is, as a single wafer that has multiple unpackaged chips, as a bare die, or in a packaged form. In the latter case, the chip is mounted in a single chip package, such as a plastic carrier with leads that are affixed to a motherboard or other higher level carrier, or in a multichip package, such as a ceramic carrier that has either or both surface interconnections or buried interconnections.

The chip can then be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

In practical embodiments, the electro-optical interposers described herein include multiple optical waveguides, mirrors and lenses in addition to electrical vias, as shown schematically in FIGS. 2 and 3. Waveguides W on interposer OI are optically coupled to waveguides W, lasers or photodetectors in chip OC mounted on interposer OI. These waveguides route the signal to other parts of the interposer. As depicted in FIGS. 3-6, an out-of-plane mirror M rotates the optical axis by 90° and couples the light beam to a lens L on the other side of the interposer OI. The lens can operate for collimation, focusing and beam size conversion.

In variants, out-of-plane mirror M can have a curvature to focus or collimate the light. In that case, no lens is required on the other side of the interposer. Rather, this is the lower interface of the interposer that would play the role of the optical transmission element in that case (appropriate optical interface condition is needed in that case, to prevent spurious effects).

Through-interposer vias V at the center carry electrical signals. There are multiple alternatives for implementing the electro-optical interposer. Silicon and glass are good candidates to be the substrate material, for several reasons. Electrical interposers have been fabricated from both materials making use of through-silicon vias and through-glass vias. Moreover, both materials are transparent to the light at the optical communication wavelengths of 1310 nm and 1550 nm, which means that optical beams can be routed through interposer OI.

Integrated lenses L can be fabricated in both material systems using known methods, such as etching after photoresist reflow. Integrated optical waveguides W can be made of dielectrics, such as polymers, silicon dioxide, silicon nitride, etc. There are several possible methods to fabricate out-of-plane mirrors M at the edge of waveguides M. Typical low-cost methods are blade cutting, laser ablation, and tilted exposure among others.

The devices described herein can be used in multiple configurations. In FIG. 4, the interposer is used as an interface to couple the optical signals between the photonic chip OC and the optical printed circuit board (PCB). The optical PCB includes optical waveguides, which route the signals to other photonic elements. FIG. 5 shows another potential utilization of the packaging assembly. The electro-optical interposer OI can be used to facilitate optical connectivity between single or multiple photonic chips OC in a vertical stack and multi-layer waveguides in an optical PCB. This is a critical advantage as three-dimensional chip stacks are expected to reach widespread use in the near future.

The configuration in FIG. 5 can offer very large data bandwidth owing to the multi-layer configuration and versatile connectivity. The configurations in FIGS. 4-5 are only two examples, a large number of packaging configurations are possible owing to the versatility of the electro-optical interposer-based technology of the present invention. This technology has a potential for application in photonic packaging because it markedly reduces complexity and costs of photonic chip packaging down to levels comparable to electronic chip packaging. Owing to the fact that fiber connections can be replaced by integrated optical waveguides both at the chip package and the PCB levels, the interconnect bandwidth of photonic chips can be increased without cost penalty.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims.

In addition, many minor modifications may be made to adapt a particular situation or material to the teachings of the present invention without departing from its scope. For instance, useful indications may be found in the background art documents listed in introduction. Therefore, it is intended that the present invention not be limited to the particular embodiments disclosed, but that the present invention will include all embodiments falling within the scope of the appended claims. In addition, many other variants than explicitly touched above can be contemplated. For example, only the optical waveguides could be fabricated integral with the interposers OI, and not the transmission elements L, or conversely, only transmission elements L could be fabricated integral with interposers OI.

What is claimed is:

1. An optoelectronic assembly, comprising:
   an optoelectronic device;
   a planar optical interposer coupled to the optoelectronic device on a first side of the optical interposer and having an optical transmission element on a second side of the optical interposer opposite to the first side;
   a deflecting element;
   at least one optical waveguide on the first side of the optical interposer, in-plane with the optical interposer; and
   a set of optical interposers, wherein each optical interposer of the set is an essentially planar component, is essentially parallel to other optical interposers of the set, is coupled on a first side to both a respective optoelectronic device and at least one respective optical waveguide having a respective deflecting element and being in-plane with each optical interposer and coupled to the respective optoelectronic device at an end and to the respective deflecting element at another end; and includes a respective optical transmission element on a second side opposite to the first side, the respective deflecting element adapted to transmit an optical signal from the respective waveguide to the respective optical transmission element and conversely, from the respective optical transmission element to the respective waveguide;
   wherein the least one optical waveguide is coupled at one end to the optoelectronic device and at another end to the deflecting element,
   wherein the deflecting element is configured to enable optical transmission between the least one optical waveguide and the optical transmission element through the optical interposer, and
   wherein the optical interposer contains a material between the deflecting element and the optical transmission element, the material allowing for optical transmission.

2. The optoelectronic assembly of claim 1, wherein the optoelectronic device is an optoelectronic chip.

3. The optoelectronic assembly of claim 1, wherein the deflecting element is a deflecting mirror.

4. The optoelectronic assembly of claim 1, further comprising:
   one or more additional planar components on the second side of the optical interposer, wherein the one or more additional planar components include an additional optical transmission element in proximity to the optical transmission element of the optical interposer allowing for the transmitting of an optical signal from the optical transmission element of the optical interposer to the additional optical transmission element.

5. The optoelectronic assembly of claim 1, wherein the respective optical waveguide in-plane with each optical interposer is bonded to each optical interposer.

6. The optoelectronic assembly of claim 1, wherein in-plane positions of two optical transmission elements of two of the respective optical interposers of the set differ; and wherein the two optical transmission elements are adapted to transmit two optical signals out-of-plane.

7. The optoelectronic assembly of claim 6, wherein the two of the optical transmission elements adapted to transmit two optical signals out-of-plane transmit the two optical signals parallel to each other.

8. The optoelectronic assembly of claim 1, wherein at least one optical transmission element is a microlens adapted for focusing an optical signal to and/or from a deflecting element or another optical transmission element.

9. The optoelectronic assembly of claim 1, wherein at least one optical interposer is an electro-optical interposer including a through-interposer vias for transmitting electrical signals to and/or from a optoelectronic device to which the at least one electro-optical interposer is coupled.

10. The optoelectronic assembly of claim 9, wherein the at least one optical interposer is an electro-optical interposer including silicon and/or glass; and a through-silicon vias and/or a through-glass electrical vias, the through-silicon vias and through-glass electrical vias adapted for transmitting electrical signals to and/or from a optoelectronic device to which the at least one electro-optical interposer is coupled.

11. The optoelectronic assembly of claim 1, wherein the at least one optical waveguide is bonded to an optical interposer and comprises one of the following materials: polymer, silicon nitride, silicon dioxide and silicon oxynitride.

12. The optoelectronic assembly of claim 1, wherein at least one deflecting element is a deflecting mirror as obtained by one of or a combination of the following methods: laser ablation, blade cutting, two-photon absorption, gray-scale lithography and imprint.

13. The optoelectronic assembly of claim 1, wherein the assembly has a 2.5-D or a 3-D packaging assembly configuration.

14. The optoelectronic assembly of claim 1, wherein the at least one optical interposer is bonded to the optoelectronic device it is coupled to on one side thereof.

15. The optoelectronic assembly of claim 1, wherein a first side of an optical interposer includes thereon one or more sets of optical waveguides, wherein each optical waveguide of the set is in-plane with the optical interposer and coupled at one end to a optoelectronic device to which the optical interposer is coupled and at another end to a respective deflecting element, the respective deflecting element configured to enable optical transmission between its respective optical waveguide and an optical transmission element, through the optical interposer.

16. The optoelectronic assembly of claim 1, wherein at least one optical waveguide is integral with the optical interposer it is coupled to and is protruding from the first side of this optical interposer, wherein one or more of the following is integral with and coupled to the optical interposer:
   an optical transmission element on a second side opposite to the first side of the optical interposer;
   a deflecting element coupled to this waveguide; and
   through-interposer vias.

17. The optoelectronic assembly of claim 1, wherein at least one optical transmission element is an optical microelement as obtained using one or a combination of the following methods: photoresist reflow, gray-scale lithography and two-photon absorption.

18. The optoelectronic assembly of claim 17, where the optical microelement is a microlens.

19. A method of fabricating an optoelectronic assembly, the method comprising:
   providing an optoelectronic device;
   fabricating at least one deflecting element as a deflecting mirror by a method selected from the group consisting of: laser ablation, blade cutting, two-photon absorption, gray-scale lithography, and imprint;

fabricating at least one optical transmission element as an optical microelement by a method selected from the group consisting of: photoresist reflow, gray-scale lithography, and two-photon absorption;

coupling a planar optical interposer to the optoelectronic device on a first side of the optical interposer and having an optical transmission element on a second side of the optical interposer opposite to the first side;

forming at least one optical waveguide on the first side of the optical interposer and in-plane therewith; and forming a set of optical interposers, wherein each optical interposer of the set is an essentially planar component, is essentially parallel to other optical interposers of the set, is coupled on a first side to both a respective optoelectronic device and at least one respective optical waveguide having a respective deflecting element and being in-plane with each optical interposer and coupled to the respective optoelectronic device at an end and to the respective deflecting element at another end; and includes a respective optical transmission element on a second side opposite to the first side, the respective deflecting element adapted to transmit an optical signal from the respective waveguide to the respective optical transmission element and conversely, from the respective optical transmission element to the respective waveguide;

wherein the least one optical waveguide is coupled at one end to the optoelectronic device and at another end to the deflecting element;

wherein the deflecting element is configured to enable optical transmission between the least one optical waveguide and the optical transmission element through the optical interposer; and wherein the optical interposer contains a material between the deflecting element and the optical transmission element, the material allowing for optical transmission.

\* \* \* \* \*